Patented June 23, 1942

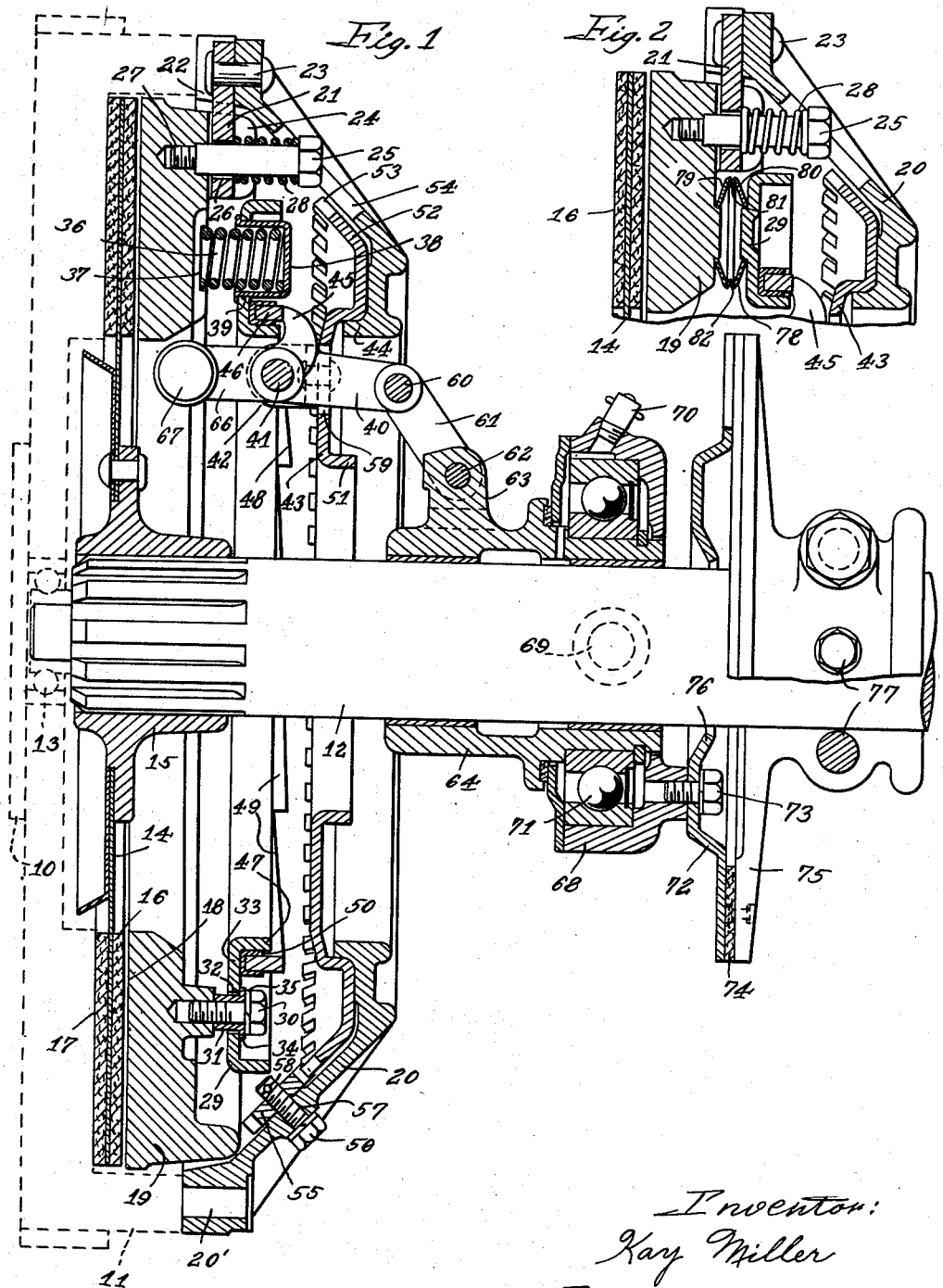
June 23, 1942.  K. MILLER  2,287,631
CLUTCH
Filed Nov. 24, 1941
Inventor:
Kay Miller
By
McCanna, Wintercorn & Morsbach
Attys.

2,287,631

UNITED STATES PATENT OFFICE 2,287,631

CLUTCH

Kay Miller, Rockford, Ill., assignor to The Atwood Vacuum Machine Company, Rockford, Ill., a partnership composed of Seth B. Atwood and James T. Atwood Original application April 12, 1941, Serial No. 388,283. Divided and this application November 24, 1941, Serial No. 420,198

2 Claims. (Cl. 192—68)

This application is a division of my copending application Serial No. 388,283, filed April 12, 1941.

This invention relates to friction clutches and is more particularly concerned with over-center type clutches especially designed for tractors, although suitable, of course, for other heavy duty purposes.

The principal object of my invention is to provide an over-center type clutch of simple, economical, and practical design and construction obtaining substantially constant engaging pressure regardless of wear and operating satisfactorily with fairly coarse and infrequent adjustment.

The invention is illustrated in the accompanying drawing, in which—

Fig. 1 is a longitudinal section through a clutch made in accordance with my invention, the same being shown in disengaged position, and Fig. 2 is a fragmentary sectional detail illustrating a variation in the construction of Fig. 1.

The same reference numerals are applied to corresponding parts in these two views.

Referring first to Fig. 1, the end portion of the crank-shaft of the engine is indicated in dotted lines at 10 and the flywheel at 11. 12 is the driven shaft extending rearwardly from the flywheel and clutch into the gear box of the transmission in the usual way. This shaft has the usual pilot bearing at 13 supporting the front end thereof at the center of the flywheel. 14 is the clutch disk, the center hub 15 of which is splined on the front end of the shaft 12 to transmit drive from the flywheel to the shaft when the clutch is engaged. The usual pads or facings 16 on the clutch disk are engageable with the driving face 17 on the flywheel and the companion driving face 18 on the pressure plate 19. The latter is suitably cast like the flywheel, the faces 17 and 18 being accurately machined to insure smooth clutch engagement. The back plate 20 is also a casting and is arranged to be bolted at 20' to the rim of the flywheel. Small rectangular plates 21, fitting in radial grooves 22 in the rim of the back plate, are secured in place by rivets 23 and have a working fit in radial grooves 24 in the rim portion of the pressure plate 19 to drive the pressure plate with the flywheel, while allowing axial movement of the pressure plate relative to the flywheel, as required in the engagement and disengagement of the clutch. Bolts 25 are entered freely through holes 26 in the plates 21 and threaded in holes 27 in the pressure plate to provide mountings for coiled compression springs 28 acting between the plates 21 and the heads of the bolts 25, as shown, to urge the pressure plate normally away from the flywheel and clutch disk to retracted disengaged position.

The pressure plate 19 carries a sheet metal ring 29 on the back thereof on screws 30, the ring being of generally channel-shaped cross-section and disposed in concentric relation to the pressure plate. Spacer collars 31 form guides for the ring 29 and are clamped by the screws against the back of the pressure plate, the collars fitting freely in holes 32 in the web portion 33 of the ring and having annular flanges 34 engaging the web portion alongside the holes 32. Lock washers 35 between the heads of the screws 30 and the collars 31 prevent loosening of the screws once they are tightened properly. The screws 30 are provided in circumferentially spaced relation on the pressure plate. Coiled compression springs 36 are also provided in circumferentially spaced relation with respect to the pressure plate 19 between seats 37 on the back of the pressure plate and stamped sheet metal cups 38 entered in holes 39 provided therefore in the web portion of the ring 29. These springs are preloaded to an extent determined by the collars 31, which, it will be easily understood, limit the extent to which the springs 36 can be compressed by the tightening of the screws 30. The term "preloaded" signifies that upon engagement of the clutch the springs 36 are subjected to further compression, and it is this increased spring pressure that is effective on the pressure plate to hold the clutch disk 14 engaged between the flywheel and pressure plate. The further compression of the springs is obtained by movement of the ring 29 relative to the collars 31 toward the pressure plate 19, such movement being given the ring in the engagement of the clutch by the actuating levers 40. A plurality of these levers are provided in equally circumferentially spaced relation with respect to the back plate 20, being pivoted, as at 41, on ears 42 provided on a sheet metal ring 43 rotatably mounted on an annular flange 44 provided on the inner side of the back plate in concentric relation with the flywheel and pressure plate. In that way the ring 43 is supported in concentric relation to the ring 29, so as to maintain proper relationship between the finger projections 45 on the intermediate pivot portions of the levers 40 and cam means 46 extending circumferentially with respect to the inner flange 47 of the ring 29. That is important because the ring 43 is arranged to be adjusted rotatively relative to the back plate to adjust the finger portions 45 of the levers relative to the inclined helical cam surfaces 48 on the correlated arcuate segments 49 of the circumferentially extending cam means 46 to compensate for wear on the clutch disk facings 16. The segments 49, of which there happen to be six, one for each of the six levers 40, are formed from straight strips of sheet metal formed to the desired arcuate shape and entered with a press fit in a sheet metal ring 50 of channel-shaped cross-section, which, in turn, is pressed into place on the inner flange 47 of the ring 29. The ring 43 has an inner annular flange 51 for reinforcement and an outer annular flange 52 which also lends strength and rigidity to the ring. However, the edge of the flange 52 is notched circumferentially, as indicated at 53, to permit using a screw driver or other tool to turn the ring 43 in the adjustment of the clutch. Inspection holes 54 in the back plate leave the notched edge of the ring exposed for such adjustment. A gear 55 meshing with the notched edge 53 of the ring 43 is mounted inside the back plate 20 on a screw 56, which is threaded in the center of the gear but has a free fit in the hole 57 in the back plate so that the gear can be used to lock the ring 43 in adjusted position by merely tightening the screw and thus clamping the gear tightly against the inner face of the back plate. A cross-pin 58 on the inner end of the screw 56 limits the unthreading of the screw 56, so that the workman cannot disconnect the screen from the gear. Obviously when the screw 56 is loosened, the gear 55 will turn freely along with the screw when the ring 43 is adjusted, and thereafter the tightening of the screw 56 clamps the gear 55 and thus holds the ring 43 securely in adjusted position.

The levers 40 project through slots 59 in the ring 43 for pivotal connection, as at 60, with toggle links 61, which, in turn, are pivotally connected at 62 with lugs 63 on a throw-out collar 64. The flat surface 65 on the front of each lug 63 serves by engagement with the edge of the inner flange 51 on the ring 43 to limit the forward movement of the throw-out collar in the engagement of the clutch when the pivots 62 have moved past a plane through the pivots 60 normal to the shaft 12; in other words, when the toggle links 61 for operating the levers 40 have been moved "over center." Each of the levers 40 has an arm 66 extending forwardly from the pivot portion of the lever and enlarged at the outer end, as indicated at 67, to serve as a counterweight, the centrifugal force on which will balance the centrifugal force on the rear end portion of the lever and thus eliminate that as a factor in the operation of the clutch. The throw-out collar 64 is operable back and forth by means of a ring 68 provided with trunnions 69 for cooperation with the usual yoke or other clutch operating means. This collar is provided with a lubricant fitting 70, whereby to insure adequate lubrication of the anti-friction bearing 71 between the ring 68 and the throw-out collar 64. A sheet metal ring 72 fastened as indicated at 73, to the back of the ring 68 serves both as a shield for protection of the brake facing ring 74 on the collar 75 and as a brake disk, the ring 72 having the inner annular edge portion 76 projecting radially inwardly into close proximity with the periphery of the shaft 12, as shown, to eliminate any likelihood of lubricant from the bearing 71 finding its way onto the collar 75 and fouling the brake facing ring 74. The collar 75 is secured, as indicated at 77, on the shaft 12 to turn with the shaft and be held against endwise movement with respect thereto, so that when the clutch is disengaged and the throw-out collar 64 assumes the position shown in Fig. 1, the ring 72 is automatically brought into contact with the brake facing ring 74 to stop the spinning of the clutch disk 14.

In operation, the springs 36 are preloaded to approximately 165 lbs. and in the engagement of the clutch are compressed to exert at least 210 lbs. pressure on the clutch disk 14 through the pressure plate 19. It requires approximately .080" travel to change the compression from the preload pressure of 165 lbs. to the engagement pressure of 210 lbs. and it follows, therefore, that a few thousandths of an inch wear on the clutch disk facings 16 will not be noticeable and cannot seriously affect the operation of the clutch. By the same token it follows that the clutch will operate satisfactorily with fairly coarse and infrequent adjustment despite the fact that the present clutch is of the over-center type and over-center clutches have heretofore necessitated frequent accurate adjustments, because even a small amount of wear on the clutch disk facings caused an appreciable reduction in the engaging pressure and resulted in excessive slippage and accelerated wear on the facings.

In the construction disclosed in Fig. 2, each spring 36 has a stacked spring washer assembly 78 substituted therefor, each assembly consisting of two Belleville type spring washers 79 and 80 with a spacer ring 81 therebetween, held in centered relationship with the washers within the curled or flanged peripheries 82 thereof. Each of these spring washer assemblies provides an initial or preload spring pressure of 130 lbs., and in the engagement of the clutch the washers are compressed further to exert at least 260 lbs. pressure. These assemblies require only .030" compression to reach the preload pressure of 130 lbs., as compared with a .060" compression in the operating range to increase the spring pressure another 130 lbs. Hence the spring means 78 may, therefore, be described as having a low rate within its operating range. Thus there is little loss in engaging pressure for a given amount of wear on the clutch disk facings when springs of this type are employed. In passing, it will be understood, of course, that the clutch, only a portion of which appears in Fig. 2, is otherwise of the same construction as that disclosed in Fig. 1, and will operate otherwise in the same way as the clutch of Fig. 1.

It is believed the foregoing description conveys a good understanding of the objects and advantages of my invention. The appended claims have been drawn to cover all legitimate modifications and adaptations.

I claim:
1. In a friction clutch, the combination with a flywheel constituting the driving element, and a clutch disk constituting the driven element, of a back plate for the flywheel, a pressure plate turning with the back plate and movable toward and away from the same in the disengagement and engagement of the clutch, respectively, a ring mounted for rotary adjustment relative to the back plate, circumferentially extending cam means on the pressure plate in concentric relation with said ring, one or more elongated levers extending in the general direction of the axis of rotation of said clutch but radially spaced therefrom, each pivoted intermediate its ends on said ring and having a radially projecting finger on the pivoted portion engaging the circumferentially extending cam means, a counterweight on one end of each of said levers, means including toggle links pivotally connected with the other end of said levers for oscillating the same to force the pressure plate away from the back plate to engage the clutch, said levers being adjustable with the ring circumferentially with respect to the cam means, and spring means held between the cam means and the pressure plate in preloaded condition and arranged to be compressed further by the action of said levers in the engagement of the clutch whereby to exert increased pressure on the pressure plate while the clutch is engaged.

2. In a friction clutch, the combination with a flywheel constituting the driving element, and a clutch disk constituting the driven element, of a back plate for the flywheel, a pressure plate turning with the back plate and movable toward and away from the same in the disengagement and engagement of the clutch, respectively, a ring mounted for rotary adjustment relative to the back plate, circumferentially extending cam means on the pressure plate in concentric relation with said ring, one or more elongated levers extending in the general direction of the axis of rotation of said clutch but radially spaced therefrom, each pivoted intermediate its ends on said ring and having a radially projecting finger on the pivoted portion engaging the circumferentially extending cam means, a counterweight on one end of each of said levers, means including toggle links pivotally connected with the other end of said levers for oscillating the same to force the pressure plate away from the back plate to engage the clutch, a throw-out collar pivotally connected with the ends of said links remote from the levers and movable toward and away from engagement with the ring, said ring limiting movement of the throw-out collar when the toggle links have been moved over center in the engagement of the clutch, said levers being adjustable with the ring circumferentially with respect to the cam means, and spring means held between the cam means and the pressure plate in preloaded condition and arranged to be compressed further by the action of said levers in the engagement of the clutch whereby to exert increased pressure on the pressure plate while the clutch is engaged.

KAY MILLER.